Figure 1:
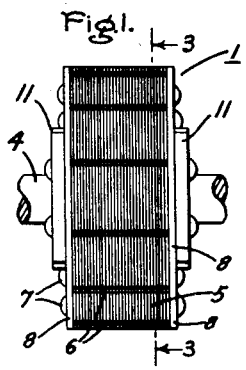

Feb. 27, 1951        F. W. MERRILL        2,543,639

ROTOR FOR SYNCHRONOUS INDUCTION MOTORS

Filed Oct. 29, 1949

Inventor:
Frank W. Merrill,
by Ernest C. Britton
His Attorney.

Patented Feb. 27, 1951

2,543,639

UNITED STATES PATENT OFFICE 2,543,639

ROTOR FOR SYNCHRONOUS INDUCTION MOTORS

Frank W. Merrill, Fort Wayne, Ind., assignor to General Electric Company, a corporation of New York Application October 29, 1949, Serial No. 124,292

6 Claims. (Cl. 172—120)

This invention relates to rotors for synchronous induction motors having permanent magnet excitation with means for providing high starting and pull-in torque and maximum magnet protection from demagnetizing fluxes.

Conventional synchronous motors are normally provided with a rotor having a certain number of direct current excited poles, the pole faces of which are usually supplied with squirrel cage windings to effect self-starting and to dampen hunting. In motors of fractional horsepower frame sizes, however, it is often physically inconvenient to provide salient direct current excited poles and accordingly, such motors may be provided with permanent magnet excited rotors as shown in Patent 2,303,893 to Friedrich Mullner and application Serial No. 96,585, filed June 1, 1949, now Patent No. 2,519,895, issued August 22, 1950, of Martin A. Edwards and Frank W. Merrill, both assigned to the assignee of the present application. Such motors include a stator member with a winding energized by alternating current and a rotor member having a permanent magnet surrounded by a laminated sleeve. Slots are provided in the outer surface of the sleeve in which squirrel cage conductors are positioned, the conductors being short-circuited by end rings forming a squirrel cage winding for self-starting.

At speeds other than synchronous, the alternating flux produced by the stator winding tends to demagnetize the permanent magnet. In addition, there is a further demagnetizing effect on the permanent magnet due to stator flux changes caused by sudden variations in the load or energizing voltage. The short-circuited squirrel cage winding has some damping effect on these demagnetizing forces which may be sufficient to protect the permanent magnet. However, it may be found desirable to supplement and increase the protective action of the squirrel cage by providing additional means for damping the alternating flux produced by the stator winding at speeds other than synchronous and stator flux changes caused by variations in the external magnetic circuit.

In the design of permanent magnet excited synchronous induction motors, it has been found desirable to arrange the squirrel cage conductors so that the section of the laminated sleeve under the conductors is as radially thin as possible in order to produce a high initial flux density under the conductors to secure synchronous rather than induction motor operation and also to insure that a substantial part of the permanent magnet flux is diverted to the stator at synchronism to effect maximum utilization of the permanent magnet material. In addition, it has also been found desirable to provide a large number of closely spaced squirrel cage conductors so that a high flux density in the restricted section of the teeth between the conductors is secured. There is a large demagnetizing influence on the permanent magnet when the motor is pulling in and out of synchronism due to large flux surges and these surges are sharply checked by the valve action of the restricted rotor teeth.

Polyphase motors of this type have been found to have an excess of starting torque and, therefore, the rotors are provided with the heaviest squirrel cage possible utilizing the maximum number of squirrel cage conductors of the largest possible size limited only by the rotor teeth saturation and the necessity of having a thin sleeve section under the conductors to permit the use of the largest diameter permanent magnet. In these rotors, the end rings have been made thick enough to approximately equal the cross section of the squirrel cage conductors per pole so as not to become a limiting factor in the rotor resistance. The combination of the thick low resistance end rings and heavy squirrel cage results in maximum magnet protection from demagnetizing fluxes; and in high pull-in torque.

However, when such a rotor is used in a single phase motor, it was found that the starting torque was insufficient. Restriction in the thickness of the end rings to increase the resistance thereof increased the starting torque but seriously reduced the pull-in torque and magnet protection. It is, therefore, desirable in the design of rotors for single phase synchronous induction motors to not only provide means for preventing demagnetization of the permanent magnet, but to also provide high starting torque and high pull-in torque.

An object of this invention is to provide an improved permanent magnet excited rotor for synchronous induction motors.

Another object of this invention is to provide an improved permanent magnet excited rotor for synchronous induction motors wherein maximum starting and pull-in torque and magnet protection are provided.

Further objects and advantages of this invention will become apparent and the invention will be better understood from the following description referring to the accompanying drawings, and the features of novelty which characterize the invention will be pointed out with particularity in the claims annexed to and forming part of this specification.

In accordance with this invention, there is provided a permanent magnet excited rotor for a synchronous induction motor comprising a permanent magnet polarized radially to respectively form polar areas at its outer surface. A laminated sleeve member is arranged around the permanent magnet and is provided with a plurality of slots in its outer surface in which squirrel cage conductors are positioned. Relatively high resistance end rings are arranged at either end of the rotor and connect the squirrel cage conductors to form a squirrel cage winding. By virtue of the squirrel cage winding, a motor provided with this rotor will start as an induction motor; however, the permanent magnet core will cause it to pull into step and run as a synchronous motor. The relatively high resistance end rings insure maximum starting torque. However, to provide maximum pull-in torque and magnet protection, a low resistance short-circuiting bar is provided at each end of the rotor, each bar extending diametrically across an end ring intermediate the polar areas of the magnet connecting the squirrel cage conductors intermediate the magnet polar areas to form a short-circuited low resistance coil around the magnet intermediate its polar areas for preventing demagnetization and for providing maximum pull-in torque.

Figure 2:
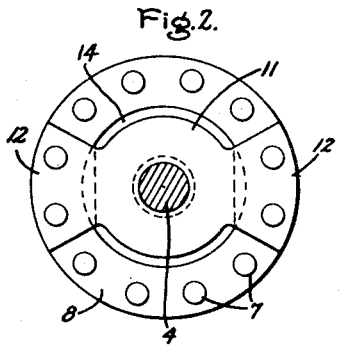
Figure 3:
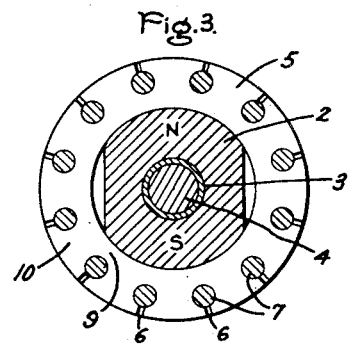
Figure 4:
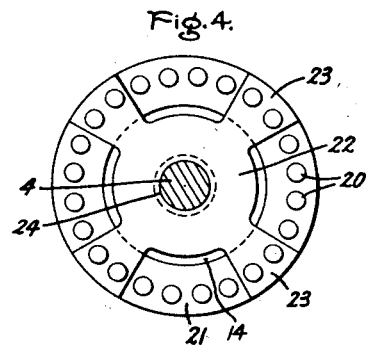
Figure 5:
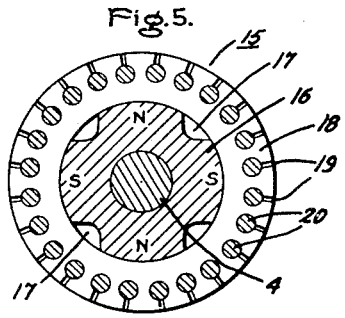
Figure 6:
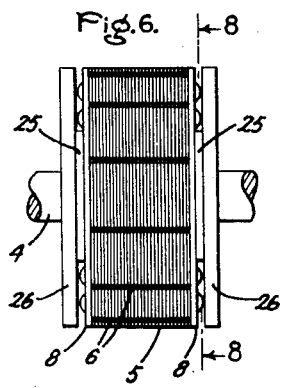
Figure 7:
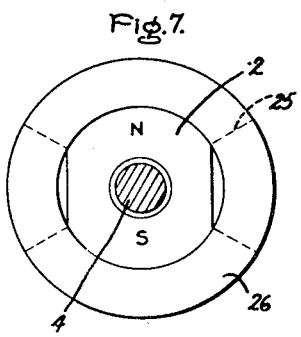
Figure 8:
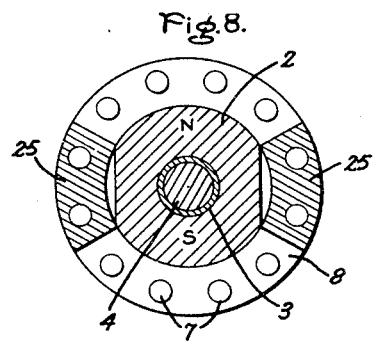

In the drawing, Fig. 1 is a side elevational view of a permanent magnet excited synchronous induction motor rotor provided with an embodiment of this invention; Fig. 2 is an end view of the rotor of Fig. 1; Fig. 3 is a cross-sectional view taken along the line 3—3 of Fig.1; Fig. 4 is an end view of a four pole permanent magnet excited rotor provided with an embodiment of this invention; Fig. 5 is a cross-sectional view of the rotor of Fig. 4; Fig. 6 is a side elevational view showing a modified form of this invention; Fig. 7 is an end view of the rotor of Fig. 6; and Fig. 8 is a cross-sectional view taken along the line 8—8 of Fig. 6.

Referring now to Figs. 1, 2 and 3, there is shown a rotor member generally identified as 1, having a permanent magnet core 2, preferably formed of a permanent magnet alloy of iron, nickel, cobalt, copper, titanium and aluminum. The permanent magnet 2 is preferably cast around a sleeve member 3 of magnetic material such as soft steel. This assembly is in turn pressed onto a shaft 4 formed of magnetic material such as steel. The permanent magnet 2 is polarized radially to form polar areas at its outer surface as shown in Fig. 3. While the permanent magnet 2 could be mounted directly on the shaft 4, the construction shown in Fig. 3 utilizing the sleeve 3 is preferred construction, it having been found impractical to press a cast permanent magnet of the type considered here directly onto a steel shaft since the permanent magnet material is so brittle that it will crack rather than yield in an elastic manner. Casting the permanent magnet material 2 around a steel tube 3 provides a soft center which may be turned instead of ground to size; and the slight clearance of its fit with the permanent magnet 2 also permits the assembly to be given a light press fit over the shaft 4.

A cylindrical laminated sleeve member 5 formed of a plurality of relatively thin laminations of magnetic material is arranged around the permanent magnet 2. The laminated sleeve member 5 is provided with a plurality of evenly spaced longitudinal slots 6 completely around its outer surface and a plurality of evenly spaced squirrel cage conductors 7 formed of conductive material such as aluminum or copper are positioned therein. A pair of end rings 8 also formed of conductive material are provided to connect the squirrel cage conductors 7 to form a short-circuited squirrel cage winding for starting the motor.

As described in the above referred to application Serial No. 96,585, the section 9 under the squirrel cage conductor 7 is made as radially thin as possible in order to produce a high initial flux density under the conductors to insure synchronous rather than induction motor operation and to permit the use of the largest possible diameter permanent magnet 2. A sufficient number of squirrel cage bars 7 is provided and the bars are closely spaced so that the flux density in the restricted section 10 of the rotor teeth is high in order to check flux surges when the motor pulls in and out of synchronism. In order to secure high starting torque with the large number of closely spaced large size squirrel cage conductors 7, the end rings 8 are relatively thin to provide a relatively high resistance squirrel cage winding. However, the provision of the relatively high resistance end rings 8 to secure high starting torque in accordance with well known principles of motor design produces a lowering of the magnet protection and of the pull-in torque.

It can be readily seen that the alternating flux produced by the stator windings not shown (the stator and windings being of any conventional alternating current type), will traverse the permanent magnet 2 and at speeds other than synchronous, will tend to demagnetize the magnet. In addition, stator flux changes caused by the variations in load or line voltage tend to produce a demagnetizing effect on the magnet. It is, therefore, desirable to provide a low resistance short-circuited coil around the permanent magnet 2 intermediate the polar areas thereof to dampen the external flux changes and thus provide protection for the magnet, and high pull-in torque. In order to accomplish this objective, the arrangement now to be described is provided. A relatively thick low resistance bar 11 formed of conductive material, such as aluminum or copper, is arranged on each end of the rotor 1, each bar extending diametrically across its associated end ring 8 and having end portions 12 in electrical contact with the end ring 8. The bars 11 serve to connect squirrel cage conductors 7 on opposite sides of the rotor intermediate the polar areas of the permanent magnet 2 to form a low resistance short-circuited coil around the permanent magnet intermediate its polar areas for preventing demagnetization of the magnet and for providing maximum pull-in torque. The low resistance short-circuiting bar 11 is provided with an opening 13 for receiving the shaft 4 and is formed leaving a slight radial clearance space 14 between the polar area of the end ring 8 to insure that the starting currents must still travel a considerable distance through the high resistance end rings 8. It has been found that the ends 12 of the short-circuiting bars 11 should cover 50° to 80° of the end rings 8 in order to secure optimum operation, the best working range being from 60° to 70°. If maximum starting torque is desired and some sacrifice in pull-in torque is permissible, a smaller coverage can be used which will give the full starting torque, however, if high pull-in torque is desired with some sacrifice in starting torque, a larger coverage is desirable.

To illustrate the improved performance provided by the short-circuiting bars 11, a small frame size motor was tested first utilizing relatively thick end rings and was found to have a starting torque of 10 ounce inches, a pull-in torque of 32 ounce inches and magnet strength of 12 volts. The end ring thickness was then reduced to about one third which increased the starting torque to 37 ounce inches, but reduced the pull-in torque to 20.8 ounce inches and the magnet strength to 10 volts. The bars 11 were then added, which increased the pull-in torque to 31.8 ounce inches and restored the magnet strength to 12 volts, while the high starting torque, obtained by the thin rings 8, was hardly affected, holding to the high value of 36.4 ounce inches. The motor tested had a 22 conductor rotor and the ends 12 of the bar 11 covered 5 conductors respectively.

It will be readily apparent that the short-circuiting bar 11 can be secured to the end rings 8 in any suitable manner as by soldering or riveting, or the squirrel cage conductors 7 under the ends 12 of the bar 11 can be extended to secure the bar to the end rings. Alternatively, the entire structure including the squirrel cage conductors 7, end rings 8, and short-circuiting bars 11 can be cast from material such as aluminum.

Referring now to Figs. 4 and 5, there is shown the application of this invention to a four pole rotor generally identified as 15 having a four pole permanent magnet 16, polarized radially as shown in Fig. 5 to form polar areas at its outer surfaces. The interpolar areas 17 are cored out to save permanent magnet material and to reduce flux leakage. A laminated sleeve member 18 is arranged around the permanent magnet 16 and is provided with a plurality of longitudinal slots 19 in the outer surface thereof. A plurality of squirrel cage conductors 20 are positioned in the slots 19 and are connected by relatively high resistance end rings 21 to form a short-circuited squirrel cage winding in the manner of Figs. 1, 2 and 3. The relatively high resistance end rings 21 provide maximum starting torque and in order to provide maximum pull-in torque and magnet protection, a low resistance short-circuiting member 22 is aranged on each end of the rotor, each short-circuiting member having a plurality of projections 23 corresponding to the number of polar areas of the permanent magnet 16, in electrical contact with the end ring 21 intermediate the polar areas of the permanent magnet. The short-circuiting member 22 forms with the squirrel cage conductors intermediate the polar areas of the permanent magnet a plurality of low resistance short-circuited coils around the permanent magnet 16 intermediate its polar areas for preventing demagnetization of the magnet and for providing maximum pull-in torque. As an alternative to the method of securing the permanent magnet to the shaft described in Fig. 3, the permanent magnet 16 may be provided with a slip fit on the shaft and the short-circuiting members 22 are provided with an opening 24 for providing a press fit on the shaft 4.

A four pole rotor constructed in accordance with Figs. 4 and 5 has been constructed and tested in a single phase stator with a resistance split starting winding. The four pole rotor without the short-circuiting members 22 and with .062 inch end rings provided a starting torque of 52.7 ounce inches and a pull-in torque of 50 ounce inches. With .047 inch end rings, the starting torque was increased to 65.5 ounce inches but the pull-in torque was reduced to 27.7 ounce inches. When short-circuiting members 22, .094 inch thick were added to the .047 inch end rings, the starting torque remained at 65.5 ounce inches and the pull-in torque was returned to 48.3 ounce inches.

Referring now to Figs. 6, 7 and 8, in which like elements are referred to by like reference numerals, there is shown a modified form of this invention wherein permanent magnet 2 is cast around sleeve 3 which in turn is mounted on shaft 4. The permanent magnet 2 is polarized radially to form polar areas at its outer surface as shown in Figs. 7 and 8. A laminated sleeve member 5 surrounds the permanent magnet 2 and a plurality of longitudinal slots 6 are formed in its outer surface. A plurality of squirrel cage winding conductors 7 are positioned in the slots 6 and relatively thin high resistance end rings 8 connect the squirrel cage conductors 7 to form a squirrel cage winding. The relatively high resistance end rings 8 provide high starting torque in accordance with well known motor design principles. In order to provide high pull-in torque and maximum magnet protection, spacer members 25 are provided respectively arranged in electrical contact with the end rings 8 intermediate the polar areas of the permanent magnet 2. Low resistance rings 26 are provided on each end of the rotor in electrical contact with the spacers 25 and serve as the short-circuiting member to connect the squirrel cage conductors 7 on opposite sides of the rotor intermediate the polar areas of the permanent magnet 2 to form a low resistance short-circuited coil around the pemanent magnet intermediate its polar areas for preventing demagnetization of the permanent magnet and for providing high pull-in torque. In this embodiment the entire inside of the laminated sleeve member 5 is left open at the ends permitting removal or insertion of the permanent magnet 2 without disturbing the squirrel cage and the short-circuiting ring members 26. Thus, rings 8 and 26, spacers 25, and squirrel cage conductors 7 may be soldered prior to insertion of the permanent magnet 2 which would be otherwise injured by the high temperature involved. The spacers 25 may be riveted to the high resistance end rings 8 or to the low resistance short-circuiting rings 26. In the alternative, the squirrel cage conductors may extend completely through the spacers 25 and low resistance short-circuiting rings 26 or the entire squirrel cage assembly may be formed of cast conductive material such as aluminum. A rotor in the same frame size as Figs. 1, 2 and 3 has been constructed in accordance with Figs. 6, 7 and 8 and tests produced the same results as the tests on the rotor of Figs. 1, 2 and 3.

While this construction is particularly advantageous when utilized in connection with single phase motors to build up the starting torque without reduction of pull-in torque and magnet protection, it is equally applicable to polyphase motors in cases where exceptionally high starting torque is required. In Figs. 1 and 6, the slots 6 are shown straight and the low resistance bar 11 of Fig. 1 or spacers 25 of Figs. 6, 7 and 8 in line on each end of the rotor and spaced 90 electrical degrees from the center line of the permanent magnet poles. However, it will be understood that the slots may be spiraled in accordance with conventional practice in which case the low resistance bars or spacers may still be in line and 90 electrical degrees from the center line of the poles disregarding the angularity of the squirrel cage conductors, or the low resistance bars or spacers may be attached so as to match the slot spiral at either end so as to contact opposite ends of the same squirrel cage conductors. Both of these arrangements have been tested and it has been found impossible to detect any difference in performance with the normal amount of spiral. However, it is generally considered desirable to keep the low resistance short-circuiting bars or spacers in line on opposit ends of the rotor to conform to the magnet which is not spiraled.

It will now be readily seen that this invention provides an improved permanent magnet excited rotor for synchronous induction motors wherein high starting torque is provided with maximum magnet protection and high pull-in torque.

While I have illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of this invention.

What I claim as new and desire to secure by Letters Patent of the United States is:

1. A rotor for a synchronous induction motor comprising a permanent magnet polarized radially to form polar areas at its outer surface, a cylindrical laminated sleeve member surrounding said permanent magnet and having a plurality of evenly spaced longitudinal slots formed in its outer surface, squirrel cage conductors respectively positioned in said slots, end rings respectively arranged on each end of said rotor connecting said conductors to form a squirrel cage winding, and low resistance means on each end of said rotor respectively connecting squirrel cage conductors on opposite sides of said rotor intermediate said polar areas of said permanent magnet to form a low resistance short-circuited coil around said permanent magnet intermediate said polar areas thereof for preventing demagnetization of said permanent magnet and for providing maximum pull-in torque.

2. A rotor for a synchronous induction motor comprising a permanent magnet polarized radially to form polar areas at its outer surface, a cylindrical laminated sleeve member surrounding said permanent magnet and having a plurality of evenly spaced longitudinal slots formed in its outer surface, squirrel cage conductors respectively positioned in said slots, relatively high resistance end rings respectively arranged on each end of said rotor connecting said conductors to form a squirrel cage winding, and a low resistance bar on each end of said rotor, each of said bars having its ends respectively connecting squirrel cage conductors on opposite sides of said rotor intermediate the polar areas of said permanent magnet to form a low resistance short-circuited coil around said permanent magnet intermediate said polar areas thereof for preventing demagnetization of said permanent magnet and for providing maximum pull-in torque.

3. A rotor for a synchronous induction motor comprising a permanent magnet polarized radially to form polar areas at its outer surface, a cylindrical laminated sleeve member surrounding said permanent magnet and having a plurality of evenly spaced longitudinal slots formed in its outer surface, squirrel cage conductors respectively positioned in said slots, relatively high resistance end rings respectively arranged on each end of said rotor connecting said conductors to form a squirrel cage winding, and a low resistance bar on each end of said rotor, each of said bars extending diametrically across one of said end rings intermediate said polar areas of said permanent magnet and having its ends respectively in electrical contact with said end ring forming with squirrel cage conductors on opposite sides of said rotor intermediate said polar areas of said permanent magnet a low resistance short-circuited coil around said permanent magnet intermediate said polar areas thereof for preventing demagnetization of said permanent magnet and for providing maximum pull-in torque.

4. A rotor for a synchronous induction motor comprising a permanent magnet polarized radially to form a plurality of pairs of polar areas at its outer surface, a cylindrical laminated sleeve member surrounding said permanent magnet and having a plurality of evenly spaced longitudinal slots formed in its outer surface, squirrel cage conductors respectively positioned in said slots, relatively high resistance end rings respectively arranged on each end of said rotor connecting said conductors to form a squirrel cage winding, and a low resistance short-circuit member on each end of said rotor, each of said members having a plurality of projections in electrical contact with its associated end ring intermediate said polar areas of said permanent magnet to form with the squirrel cage conductors intermediate said polar areas a plurality of low resistance short-circuited coils around said permanent magnet intermediate said polar areas thereof for preventing demagnetization of said permanent magnet and for providing maximum pull-in torque.

5. A rotor for a synchronous induction motor comprising a permanent magnet polarized radially to form polar areas at its outer surface, a cylindrical laminated sleeve member surrounding said permanent magnet and having a plurality of evenly spaced longitudinal slots formed in its outer surface, squirrel cage conductors respectively positioned in said slots, relative high resistance end rings respectively arranged on each end of said rotor connecting said conductors to form a squirrel cage winding, low resistance spacers arranged in electrical contact with said end rings at opposite sides of said rotor intermediate said polar areas of said permanent magnet, and a low resistance end ring on each end of said rotor, each of said low resistance end rings being respectively in electrical contact with the spacers associated with one of said high resistance end rings for connecting squirrel cage conductors on opposite sides of said rotor intermediate said polar areas of said permanent magnet to form a low resistance short-circuited coil around said permanent magnet intermediate said polar areas thereof for preventing demagnetization of said permanent magnet and for providing maximum pull-in torque.

6. A rotor for a synchronous induction motor comprising a permanent magnet polarized radially to form polar areas at its outer surface, a cylindrical laminated sleeve member surrounding said permanent magnet and having a plurality of evenly spaced longitudinal slots formed in its outer surface, squirrel cage conductors respectively positioned in said slots, relative high resistance end rings respectively arranged on each end of said rotor connecting said conductors to form a squirrel cage winding, and a low resistance bar on each end of said rotor, each of said bars connecting the squirrel cage conductors on opposite sides of said rotor intermediate said polar areas of said magnet to form a low resistance short-circuited coil around said permanent magnet intermediate said polar areas thereof for preventing demagnetization of said permanent magnet and for providing maximum pull-in torque, each of said bars being spaced from its adjacent end ring in the region of said polar areas of said permanent magnet.

FRANK W. MERRILL.

REFERENCES CITED

The following references are of record in the file of this patent:

UNITED STATES PATENTS

| Number | Name | Date |
| --- | --- | --- |
| 2,078,805 | Merrill | Apr. 27, 1937 |
| 2,303,893 | Mullner | Dec. 1, 1942 |
| 2,407,883 | Jackson | Sept. 17, 1946 |
| 2,432,436 | Morrill | Dec. 9, 1947 |
| 2,461,566 | Morrill | Feb. 15, 1949 |